Sept. 18, 1956   D. B. DOOLITTLE ET AL   2,763,467
CONSTANT TENSION WINCH
Filed July 2, 1954   3 Sheets-Sheet 2
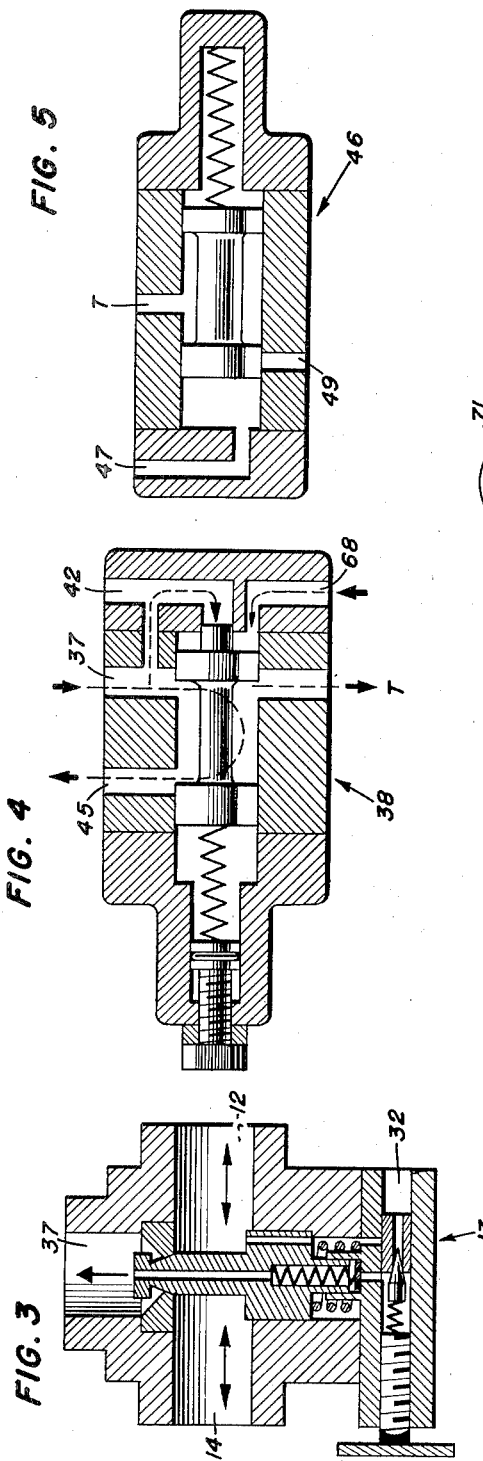
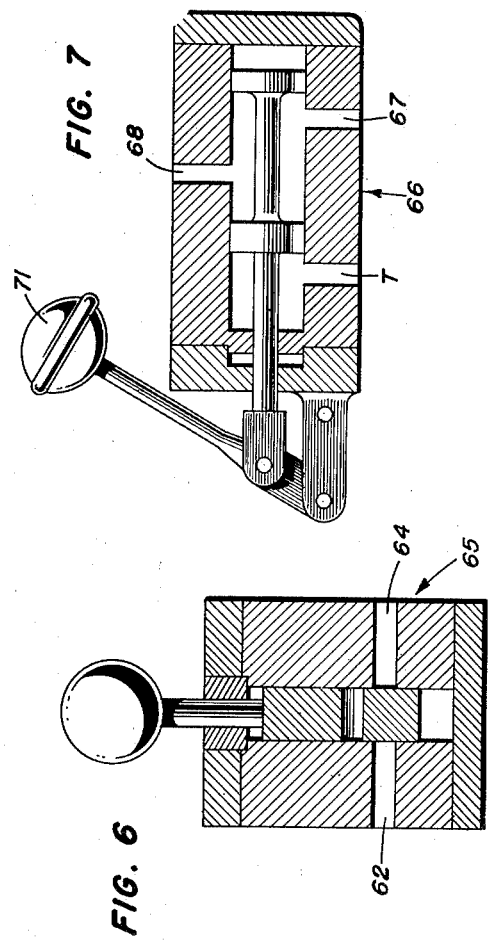
INVENTORS
R. B. JANNEY II
BY D. B. DOOLITTLE
ATTORNEYS Sept. 18, 1956
D. B. DOOLITTLE ET AL
2,763,467
CONSTANT TENSION WINCH
Filed July 2, 1954
3 Sheets-Sheet 3
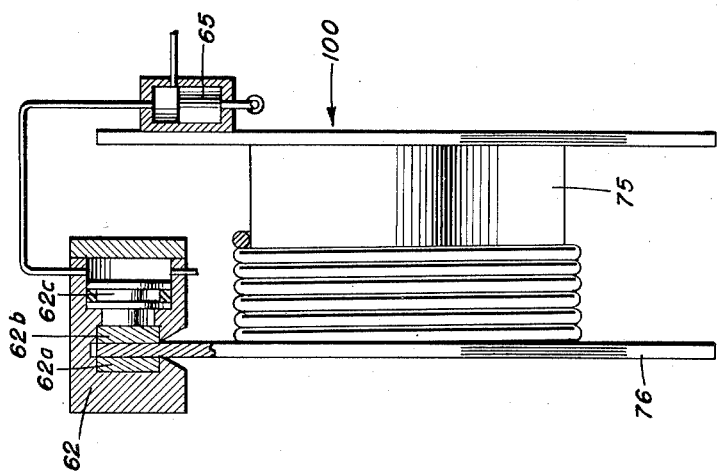
INVENTORS
R. B. JANNEY II
D. B. DOOLITTLE
BY
ATTORNEYS United States Patent Office 2,763,467
Patented Sept. 18, 1956

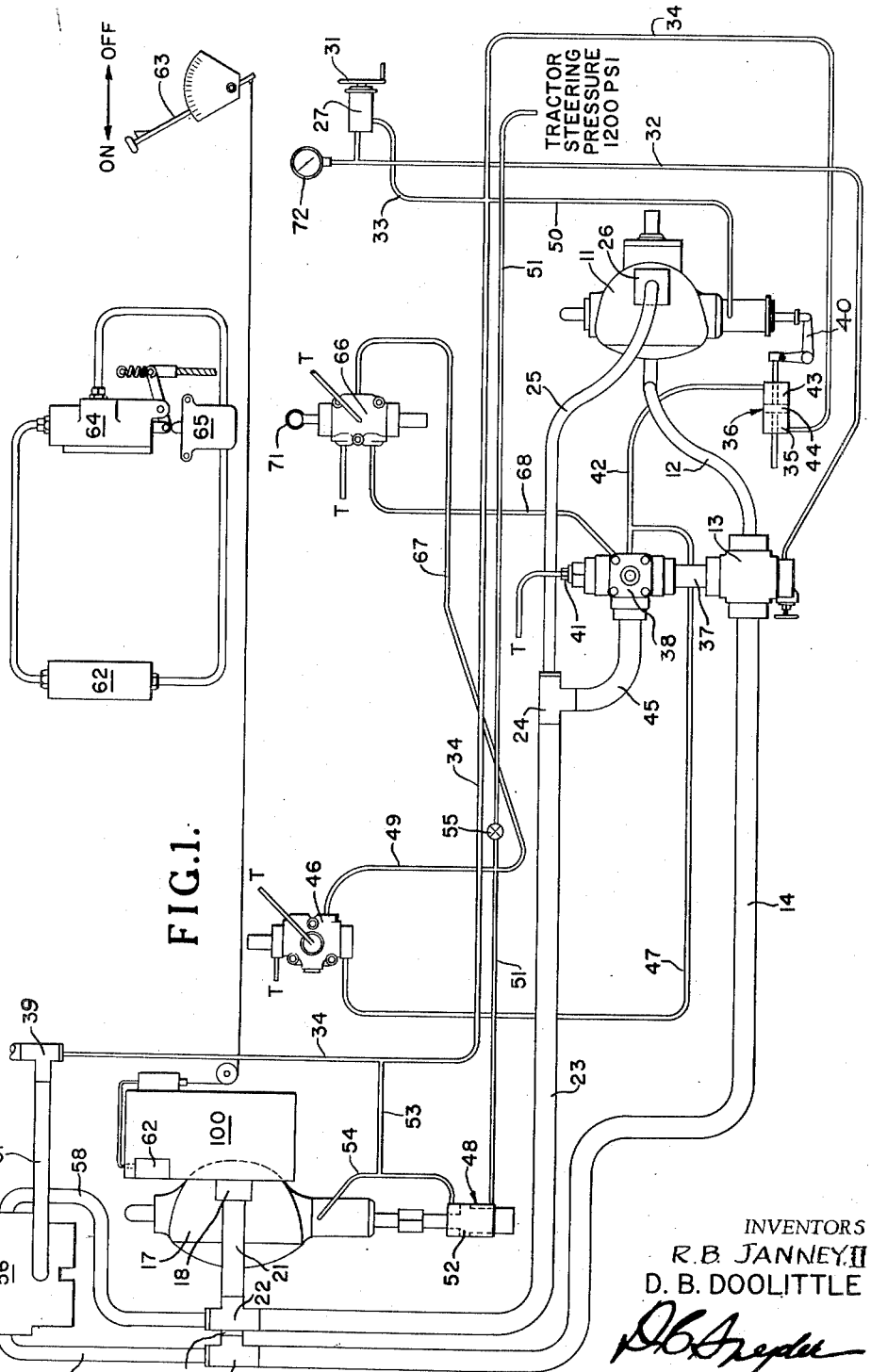

2,763,467

CONSTANT TENSION WINCH

Donald B. Doolittle and Raymond B. Janney II, Wilmington, Del., assignors, by mesne assignments, to the United States of America as represented by the Secretary of the Navy Application July 2, 1954, Serial No. 441,191

6 Claims. (Cl. 254—172)

The present invention relates to a constant tension winch and more particularly to a constant tension winch which operates automatically and senses any slack about to come in the winch cable, thereby keeping the cable under a pre-set tension.

The previous known winches had numerous manual controls and, although a system had been installed which would prevent the winch from exceeding any pre-set tension, the winch was not of sufficient capacity for all airship mooring operations and there was no satisfactory method of maintaining proper cable tension or of preventing slack from entering the system.

The present invention is a constant tensioning cable winch which is fully automatic and senses or anticipates slack in the cable by a novel hydraulic system. This invention requires only two controls; namely, a brake and a control to set the cable tension; then the hydraulically operated system does not allow the tension to exceed the control setting and will always keep proper tension on the cable by sensing a quick take-in or pay-out of the cable.

Another object is to provide an automatic hydraulic system which will sense any quick take-in or pay-out of the cable and keep a predetermined tension on the cable, without allowing any slack in the cable.

A final object of the present invention is the provision of a mooring device which responds automatically to load conditions according to a desired pre-set tension setting and which maintains the proper cable tension by preventing any slack from entering the cable.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is a schematic drawing of the present hydraulic winch system; and

Fig. 2 is a diagram of the winch brake control system.

Fig. 3 is a sectional view of the main relief valve.

Fig. 4 is a sectional view of the sequence relief valve.

Fig. 5 is a sectional view of the slack-sensing valve.

Fig. 6 is a sectional view of the brake pilot valve.

Fig. 7 is a sectional view of the manually operated relief valve.

Fig. 8 is a sectional view of the brake mechanism.

Referring now to the drawings, there is shown in Fig. 1, which illustrates the hydraulic system, a hydraulic pump 11 which is a Vickers variable displacement piston type pump capable of pumping approximately 50 gallons per minute output at 1200 R. P. M. or any other well known hydraulic pump of the same type, said pump having a normal outlet through a bottom port and through a high pressure hose 12 to the main system relief valve 13. A pipe 14 carries the principal pressure flow to a T 15 through a pipe 16 to a bottom port, not shown, of the winch motor 17. The winch motor 17 is a Vickers MV2050 which at full stroke, maximum displacement, is capable of reeling in at any cable tension up to 3500 pounds. The return flow goes out connector 18 of the motor through a pipe 21 to a T 22 through a pipe 23 to a T 24 through hose 25 and through a connector 26 on top of the pump.

Cable tension is controlled by setting the main system relief valve 13 which is made up of pressure valves that allow only a certain amount of fluid to flow through the valve from the pump to the motor, the pressure valves are allowed to open only as far as permitted by pressure being exerted on one side of the valves by fluid pressure through tube 32 from a remote relief valve 27. The remote relief valve 27 is manually operated by a hand wheel 31, whereby turning the hand wheel clockwise increases cable tension and counterclockwise decreases cable tension. Pressure through tube 32 is exerted on the main system relief valve according to the manual setting of the control handle 31 at the remote relief valve, the pressure from the remote relief valve sets the pressure valves of the main system relief valve 13 and controls the amount of fluid that will pass through the main system relief valve 13 from the pump 11 to pipe 14 and to the motor 17. Pressure is applied to the remote relief valve 27 through a tube 33 which connects with tube 34, the tube 34 furnishing a replenishing fluid supply at 150 p. s. i. from the tractor pressure system, not shown, to the motor through tubes 53 and 54 and to the pump through tube 50.

The pump is automatically controlled by the system pressure, tractor replenishing pressure which insures a constant and continuous source of presure of 150 p. s. i. to the overall system, which is supplied through tube 34 connected to the tractor pressure line by T 39 and to side 35 of a pump stroking cylinder 36. This pressure is always trying to increase the pump displacement by moving piston 44 and thereby increasing the pump stroke by the mechanical linkage 40 said linkage being directly coupled to the moving piston 44. Thus initially, full flow is pumped to the motor 17 through the relief valve 13 and pipe 14; if the motor does not require all this flow, the surplus goes from the main system relief valve 13 through pipe 37, over a sequence relief valve 38 and out through an orifice 41 to a tank, not shown. As the surplus increases, the pressure behind orifice 41 increases and is piped through tube 42 to side 43 of cylinder 36; when this back pressure exceeds the replenishing pressure, 150 p. s. i., the piston 44 in cylinder 36 will be forced to the left, toward side 35, and will short stroke the pump which will pump less fluid over the valve 13 and to the motor. If then the airship wants to come in faster than the rate at which it is being drawn in under the tension of the cable, the motor will take more flow from the pump and less flow will go over the sequence relief valve 38 and the orifice back pressure will drop off until it gets below 150 p. s. i. on side 43 of the pump stroking cylinder 36, then the piston 44 will be forced to the right, toward side 43 of the cylinder, and the pump will lengthen its stroke and put out more fluid until it furnishes enough flow to satisfy the motor and still put enough surplus flow over the relief valve to hold a back pressure of 150 p. s. i. Thus the pump maintains a stable stroke angle to satisfy the motor and still maintain a small surplus flow through orifice 41.

If the airship is caught by the wind and starts to move out rapidly taking the cable off winch 100 at speeds up to 1500 ft. per minute, the motor will not only require less and less flow from the pump but at high pay-out speeds the motor will act as a pump and will pump as much as 115 gallons of fluid per minute back toward the pump 11 through pipe 14, and through the main system relief valve 13, this will further increase the surplus overflow over the sequence valve 38 and increase the orifice back pressure, short stroking the pump. This process will continue until the pump is stroked to the center, when the pump reaches its center stroke position and can absorb no more of the excess motor flow, the orifice back pressure will continue to rise and when this pressure reaches 500 p. s. i. the sequence valve 38 will open to allow the fluid flow from the motor to by-pass the orifice through pipe 45 to T 24, pipe 23 and into the outlet side 18 of the motor. The principal function of sequence valve 38 is to supply sufficient flow back to the motor 17 to prevent cavitation under the high speed pay-out condition. When the airplane has reeled out as far as it can under the tension of the cable the pressure builds up in the lines and the motor will again act as a motor instead of a pump and the winch will automatically start to reel in again since the pump will be supplying fluid to the motor.

Probably the most important requirement of a ground handling winch for airships is that slack should never be allowed to come into the cable. If a gust of wind blows the airship toward the winch, the winch must not only take up the slack but it must anticipate that slack is about to come and take appropriate action to prevent it. The slack sensing feature is accomplished by short stroking the motor thus increasing its speed with a corresponding decrease in motor torque. As the speed of pay-in at constant tension increases, the requirements of the motor are satisfied by the automatic stroking of the pump. As the pay-in exceeds 500 feet per minute, the pump has reached maximum stroke and the motor is taking all the pump output, the orifice back pressure over sequence valve 38 from the relief valve 13 then decreases below 150 p. s. i. and at about 50 p. s. i., there is not sufficient pressure to hold pilot operated four-way slack sensing valve 46 closed against an internal spring which is trying to open the valve against the pressure provided by the orifice back pressure through pipe 47. The motor has a stroking cylinder 48 which has fluid at 1200 p. s. i. furnished by the tractor steering pressure through line 51 to one side of piston 52 and replenishing pressure of 150 p. s. i. is supplied to the other side of piston 52 through tube 53 joined to tube 34 and tube 54 connecting the stroking cylinder 48 and the motor 17. The steering pressure fluid holds the motor at full stroke while replenishing pressure is standing by to short stroke the motor in the event the steering pressure is cut off, when the motor is taking nearly all the pump flow and the pump can not supply any more flow the slack sensing valve knows that there is danger of slack since the orifice back pressure reduces to about 50 p. s. i. which allows the pilot operated four way valve 46 to open and dump the steering pressure fluid supplied through tube 49 which is holding full stroke on the motor. Replenishing pressure then short strokes the motor increasing the speed of the motor and the cable pay-in, the motor short strokes only as far as is required to maintain tension in the cable at the speed at which the airship chooses to come toward the tractor. At short stroke, the motor can reel in the cable well over 1500 feet per minute and when the airship slows down to 500 feet per minute again the motor no longer requires all the flow from the pump; the flow over the relief valve 13 increases and the orifice back pressure increases, closing off the slack sensing valve and permitting the steering pressure fluid to return the motor to full stroke and restore the preset tension in the cable. The pressure fluid is carried from the slack sensing valve by tubes T to a tank, not shown. The entire cycle is automatic and orifice 55 is placed in line 51 so that only one gallon per minute of the steering pumps fluid output is used in this control.

The slack sensing valve operates automatically at any time the orifice back pressure becomes 50 p. s. i.; since the pump is pumping some excess fluid over the sequence valve at all times, therefore maintaining a fluid supply for the motor, it is recognized that no slack could come into the cable because the slack sensing valve will go into operation when the excess fluid pressure drops to 50 p. s. i. and this will in turn short stroke the motor increasing the speed and take up any slack which is about to come in the cable.

The system has a replenishing valve 56 which makes up all the fluid losses of the main system by a system of check valves. The replenishing valve incorporates two relief valves, one for the pressure side which is connected by pipe 57 connected to T 15 and one for the return side connected to T 22 by a pipe 58. The remote control valve 27 can be set at pressures up to 3100 p. s. i. so the pressure side valve in the replenishing valve is set at 3200 p. s. i. and will relieve the pressure side if the pressure should build up above 3100 p. s. i. The return side relief valve is set at 250 p. s. i. and will open to relieve the return pressure if it should build up to 250 p. s. i. The fluid is supplied to the replenishing valve by pipe 61 connected to T 39 in the tractor pressure line.

A manually operated relief valve 66 is connected to the tractor steering pressure line 51 by a tube 67 and to the sequence valve 38 by a tube 68. The valve is hand operated by a handle 71 which allows the system fluid to by-pass through the valve and the winch to reel-out by pulling on the cable. Opening of the valve relieves the system pressure and allows the fluid to pass through the valve to the tank, not shown.

The winch 100 is provided with a brake 62 which is a manually operated hydraulic brake with a ratcheting lever control 63. As can be more clearly seen in Fig. 8 the winch assembly 100 consists of a drum 75, on which the cable is wound, and side flanges 76 securely fastened to the drum. The brake assembly 62 consists of several stationary brake pucks 62(a) bearing against one side of one of the flanges 76 and several floating brake pucks 62(b) actuated by individual brake cylinders 62(c), the pressure on all the brake cylinders being controlled simultaneously by the movement of pilot valve 65. The brake system incorporates an automatic bleeding arrangement which, when the brake is off, vents the residual brake pressure back to a brake reservoir 64 through a pilot valve 65. The pilot valve is depressed by springing the tension on the brake activating lever, when the brake control is released to the off position, the purpose of the bleed when the brake is off is to permit one man to reel-out the cable manually when connecting the cable to an airship at the beginning of the mooring operation. With the tension set at zero and the brake released the cable can be reeled out since no tension would be on the cable from the automatically operated system, the only pull against the reel-out would be the friction from turning the winch. The brake can be applied to the winch at any time during the operation and the cable will maintain a fixed length, the system, being automatic, will be ready to reel-in at the time the brake is released and hold a constant tension on the cable at all times.

The parts of the hydraulic system are connected to a tractor and the pump 11 is driven by a prime mover on the tractor. The winch controls, brake and hand wheel, are located at the tractor operator's station to obtain one man operation of the winch and a tension pressure gage 72 is connected to line 32 so that the operator can check the tension of the cable by looking at the indicated tension of the gage.

In order to use the winch to reel-in an airplane, the operator places the tension control handle at zero and then releases the brake; one man should be able to reel-out the cable to the desired distance and hook the cable to the airplane. The operator then sets the desired cable tension by turning control handle 31, the tension is indicated on the indicator 72, and the operator can increase or decrease the cable tension by turning the control handle. The optimum cable tension setting can only be determined by operation, and should be less than the maximum allowable tension as determined by the strength of the airship anchor patch and should be high enough to eliminate excessive pay-out of cable depending on wind conditions. The setting of the remote relief valve 27 controls the cable tension by controlling the flow of fluid from the pump 11 through the main relief valve 13 to the motor. If the pump puts out more fluid than necessary for the motor, the fluid forms a back pressure over the sequence valve 38 behind orifice 41 and on side 43 of cylinder 36 to change the stroke of the pump and put out less fluid. In case the airship is blown toward the tractor and the pump is not putting out enough fluid to the motor the back pressure over the sequence valve drops off causing the pump to have a longer stroke by the piston moving toward side 43 of the cylinder 36; when the pressure drops enough, the slack sensing valve 46 opens and dumps the pressure from behind the motor stroking piston which short strokes the motor and the motor reels-in faster to keep slack from entering the cable. The operator has only two controls to operate the winch, the brake handle and the tension control handle; after the operator sets the tension control handle the system operates automatically by the pressure in the system according to the conditions on the airship being reeled-in.

The function of this constant tension winch is to provide a system whereby the operator can set and maintain a constant selected cable tension by the system operating automatically according to the conditions that prevail.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

What we claim is:

1. In a constant tension winch system, a variable delivery pump as a source of pressure, a winding drum, a fluid activated motor connected to said winding drum and arranged to receive by hydraulic coupling means fluid under pressure from said delivery pump, a control device for said pump comprising a movable means for shifting the stroke of the pump to vary the volume of fluid delivered to said motor, means to control the fluid flow from the pump to the motor, and a hand operated means which pre-sets said means for controlling the amount of fluid flow from said pump to said motor.

2. The features of claim 1, wherein said motor has a control device comprising a pressure operated cylinder for shifting the stroke of the motor.

3. The features of claim 2, wherein the control devices for said motor and said pump have self-regulating means to vary their respective strokes according to the tension that prevails on the winch cable and as to the pre-set setting of said hand operated means.

4. In a device for pulling on an object while subject to varying external forces counteracting the pull, the combination of a winch, said winch having a cable thereon, variable speed means for driving the winch, self-regulating means responsive to the varying external forces on the winch for controlling the speed of the driving means to maintain a constant tension on the winch cable, means manually operable to set a pre-determined tension on said cable, a variable displacement pump for supplying fluid to said winch drive means, self-acting control means for controlling said pump to supply the necessary fluid to said variable drive means and a replenishing valve to supply fluid to the system for maintaining the desired pressure.

5. In a device for pulling on an object while subject to varying external forces counteracting the pull, the combination of a winch, variable speed means for driving the winch, a four-way valve actuated by the back pressure of the system thereby controlling the displacement of the variable speed means to maintain a constant tension on the winch cable under certain conditions, a variable delivery pump as a source of pressure for said variable speed means, a control valve to control the amount of fluid from said delivery pump to said variable speed means and a hand control means for pre-setting said control valve to maintain a constant tension on the cable.

6. In a constant tension winch system, a variable delivery pump as a source of pressure, a fluid actuated motor arranged to receive by hydraulic coupling means fluid under pressure from said delivery pump, a fluid actuated cylinder to vary the stroke of said delivery pump, a second fluid actuated cylinder to vary the stroke of said motor, said motor being connected to a winding drum, said drum having a cable thereon for pulling an object, a valve that controls the amount of fluid from said delivery pump to said motor, a remote valve having a control handle for establishing a pre-determined tension on said cable, said remote valve hydraulically connected to said valve, a sensing valve responsive to slack in said cable and operated by the fluid pressure in the system, said sensing valve connected to said second fluid actuated cylinder to control said motor and prevent slack from entering said cable, a gage to indicate the tension setting, a brake on said winding drum to stop said drum and a control handle to operate said brake.

References Cited in the file of this patent

UNITED STATES PATENTS

| Re. 20,551 | Rouse | Nov. 9, 1937 |
| 2,243,642 | Muir et al. | May 27, 1941 |
| 2,609,181 | Jaeschke | Sept. 2, 1952 |